US011861335B1

(12) United States Patent
Margolin et al.

(10) Patent No.: US 11,861,335 B1
(45) Date of Patent: Jan. 2, 2024

(54) LEARN TO EXTRACT FROM SYNTAX TREE

(71) Applicant: INTUIT INC., Mountain View, CA (US)

(72) Inventors: Itay Margolin, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/361,796

(22) Filed: Jul. 28, 2023

(51) Int. Cl.
*G06F 8/41* (2018.01)
(52) U.S. Cl.
CPC ...................................... *G06F 8/42* (2013.01)
(58) Field of Classification Search
CPC ........................................................ G06F 8/42
See application file for complete search history.

(56) References Cited

U.S. PATENT DOCUMENTS

| 2018/0373986 | A1* | 12/2018 | Rainwater | G06F 11/36 |
| 2022/0066752 | A1* | 3/2022 | Zhang | G06N 3/02 |
| 2023/0236811 | A1* | 7/2023 | Sundaresan | G06N 3/08 |
| | | | | 717/110 |

FOREIGN PATENT DOCUMENTS

CN          115659356  A  *  1/2023

OTHER PUBLICATIONS

Lv et al., "BovdGFE: buffer overflow vulnerability detection based on graph feature extraction" (Year: 2023).*
Hu et al., "TreeCen: Building Tree Graph for Scalable Semantic Code Clone Detection" (Year: 2022).*

* cited by examiner

*Primary Examiner* — Phillip H Nguyen
(74) *Attorney, Agent, or Firm* — DLA PIPER LLP (US)

(57) ABSTRACT

A system deploying a machine learning technique that utilizes known code graph and abstract syntax tree pairs for known JSON objects to learn a function for predicting a corresponding abstract syntax tree from a new JSON object. The predicted abstract syntax tree is used to generate code for formatting the new JSON object into a standardized data structure.

20 Claims, 11 Drawing Sheets

Prediction Phase

LEARN TO EXTRACT FROM SYNTAX TREE

BACKGROUND

Some conventional computer systems are known to scrape desired information from various online sources. The purpose of the scraping is to extract desired information stored in an unknown format and store the scraped information in a standardized format. This is accomplished by a coded scraping policy that is tailored to each individual online source due to different website layouts, different API schemes, different ways to communicate with the client, etc. Conventionally, engineers must write the code manually for each online source. This is problematic because any small change in the information format and/or the communication protocol yields a change in the code, which undesirably yields enormous engineering and operational efforts.

SUMMARY

Embodiments disclosed herein solve the aforementioned technical problems and may provide other technical solutions as well. Contrary to conventional techniques, the learn to extract from syntax tree (LEST) system disclosed herein implements an automated machine learning technique that utilizes known code graphs and abstract syntax trees to learn a function for predicting a corresponding abstract syntax tree from a JSON object. The corresponding abstract syntax tree is used to generate the code for formatting the JSON object into a standardized data structure. In other words, manually coding the scraping method is avoided.

An example embodiment includes a method performed by a processor. The method may include capturing training data including JSON objects and corresponding code to transform the JSON objects into a desired data structure, transforming JSON objects into code graphs, transforming code graphs into abstract syntax trees (ASTs), and performing machine learning with pairs of code graphs and corresponding ASTs to determine a function to approximate an AST from a code graph.

Another example embodiment includes a system. The system may comprise a non-transitory storage medium storing computer program instructions, and one or more processors configured to execute the computer program instructions to cause operations to be performed. The operations may include capturing training data including JSON objects and corresponding code to transform the JSON objects into a desired data structure, transforming JSON objects into code graphs, transforming code graphs into abstract syntax trees (ASTs), and performing machine learning with pairs of code graphs and corresponding ASTs to determine a function to approximate an AST from a code graph.

DETAILED DESCRIPTION OF SEVERAL EMBODIMENTS

To mitigate the above deficiencies, embodiments disclosed herein leverage an LEST system that implements a machine learning technique that utilizes known code graph and abstract syntax tree pairs to learn a function for predicting an abstract syntax tree from a corresponding nested tree object such as a JSON object. The predicted abstract syntax tree is used to generate the code for formatting (i.e., mapping) the JSON object into a standardized data structure such as a table (i.e., desired data structure).

In one example, various JSON objects may be scraped from an online source. Rather than manually writing code to transform these JSON objects into a standardized data format (e.g., table), the disclosed LEST system performs machine learning by utilizing known code graph and abstract syntax tree pairs for the JSON objects from the source to learn a function for predicting a corresponding abstract syntax tree from a JSON object. The corresponding abstract syntax tree is used to generate the code for formatting the JSON object into a standardized data structure. In other words, known conversions from JSON objects to the standardized data structure may be used to train the LEST system to generate code that will accurately transform the JSON objects to the standardized data structure even when changes occur in the layout and in the communication protocol of the informational source.

The above-described features are now described in detail with respect to FIGS. 1-7. It is noted that the examples disclosed herein are directed to the conversion of JSON objects to data tables. However, it is noted that the disclosed system and method are applicable to converting any nested tree object to any standardized data structure.

JSON, or JavaScript Object Notation is an intuitive notation for representing and transmitting data between servers and web applications. Essentially a JSON object includes key-value pair and an ordered list of data values. The JSON object may support various data types including, but not limited to strings, numbers, Boolean values, arrays and objects. In one example, JSON objects are used in application programming interfaces (API) for exchanging data between different computer systems. For example, payroll data may be sent as JSON objects from a financial institution to a payroll system for further processing.

Figure 1:
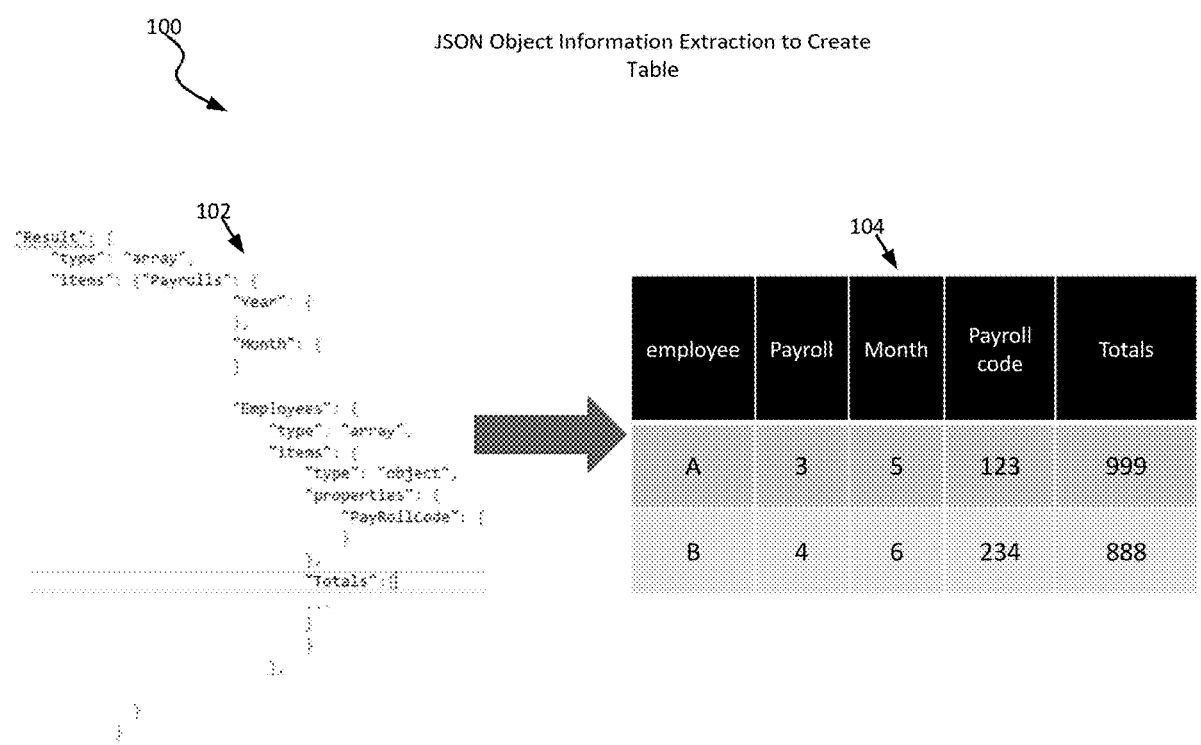
FIG. 1 shows a diagram of a JSON object converted to a standardized data structure, based on the principles disclosed herein.

FIG. 1 shows a diagram 100 of an example JSON object converted to a standardized data structure (e.g., a table).

JSON object 102 generally includes key-value pairs including arrays of strings for identifying categories, characters for identifying employees and numerical values for payroll data of employees. The strings include the categories (e.g., employee, payroll, month, payroll code, and totals), whereas the characters and numerical values are the values corresponding to the employee data with respect to the categories. The strings, characters and numerical values of JSON object 102 are extracted from the JSON object and converted into a data table 104 by a coded algorithm.

JSON object 102 shown in FIG. 1 is an example of financial data that may be stored by financial institutions for millions of customers. Each financial institution, however, may have differently formatted JSON objects for representing the financial data. Manually writing code for converting JSON objects of various formats into standardized data formats (e.g., tables) would be time consuming. Therefore, a method and system for automatically generating the code required to convert JSON objects of various formats into standardized data formats (e.g., tables) is beneficial. The LEST method and system described herein implement machine learning, including a training phase that utilizes known JSON objects and corresponding AST pairs to learn how to predict, during a prediction phase, ASTs from new JSON objects that may have varying formats. These ASTs may then be converted to code for converting the JSON objects into standardized data formats.

The training phase generally includes four steps. The first step includes capturing known JSON objects and the known corresponding code that converts the known JSON objects into a known standardized data format. The second step of the training phase includes transforming the known JSON objects into code graphs. The third step of the training phase includes transforming the known corresponding code into abstract syntax trees (ASTs). The fourth step of the training phase includes using known code graph and AST pairs to learn a function to predict an unknown AST from a new JSON object. This is beneficial because the predicted AST can then be compiled to create a function for converting the new JSON object into the standardized data format (e.g., table). In other words, the learning process to generate the appropriate code is performed in the abstract using the relationships between the code graphs and their corresponding ASTs. These four training steps are now described with respect to FIGS. 2A-2D.

Figure 2A:
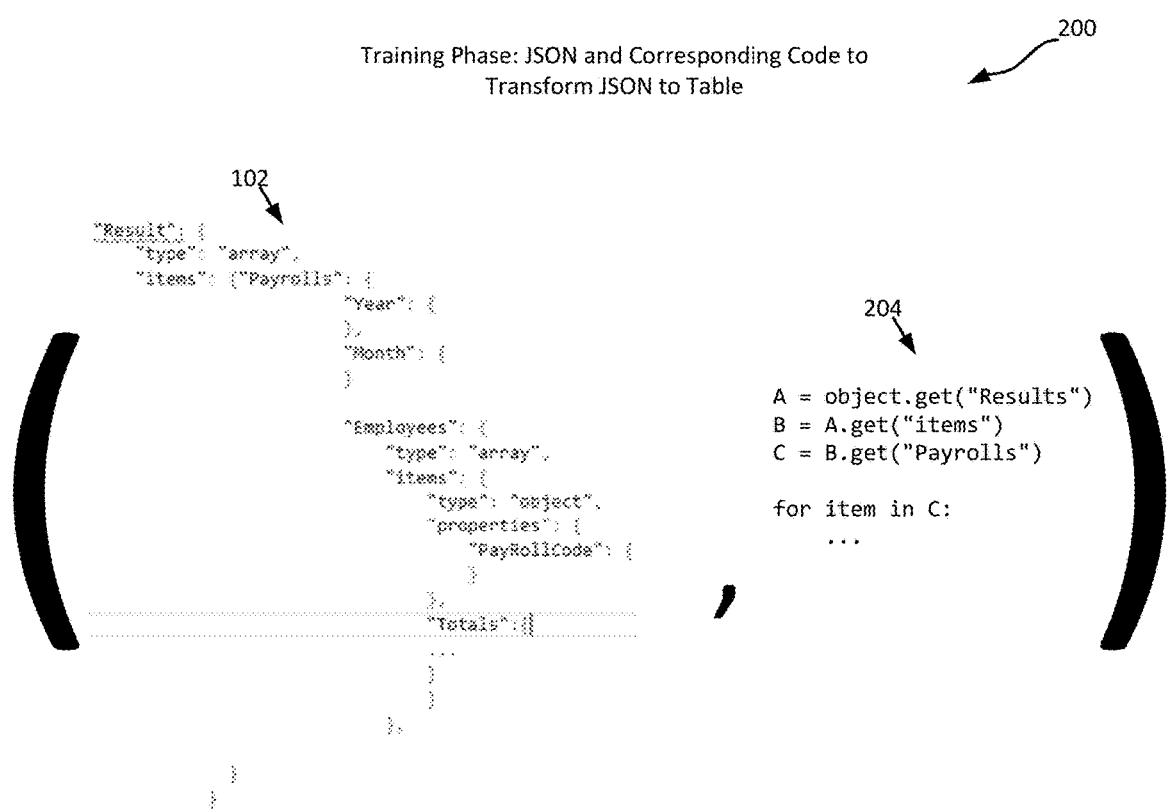
FIG. 2A shows a diagram of a JSON object and corresponding code for transforming the JSON object to the standardized data structure, based on the principles disclosed herein.

FIG. 2A shows diagram 200 of a JSON object and corresponding code for transforming the JSON object into the standardized data structure. As mentioned above, the JSON object 102 generally includes key-value pairs including arrays of strings for identifying categories, characters for identifying employees and numerical values for payroll data of employees. Code 204 for transforming the JSON object to the standardized data structure (e.g., a table) generally includes commands to "get" (i.e., extract) the various key-value pairs from the JSON object. For example, the commands may get the desired key-value pairs for certain employees (e.g., employees A and B). Although not shown, the code may also include a command for packaging and displaying the extracted key-value pairs in the standardized data structure (e.g., the table).

It is noted that numerous pairs of similar JSON objects and the corresponding code for transforming the JSON objects to the standardized data structure are captured and utilized in the training phase. The pairs of JSON objects and corresponding code generally may be for converting the JSON objects into the same or a similar standardized data structure (i.e., a similar table desired by the destination system that processes the information). It is also noted that although the examples described herein are related to JSON objects and corresponding JAVA code for extracting the key-value pairs and displaying the extracted key-value pairs in the standardized data structure (e.g., the table), other programming objects and programming languages may be utilized.

Figure 2B:
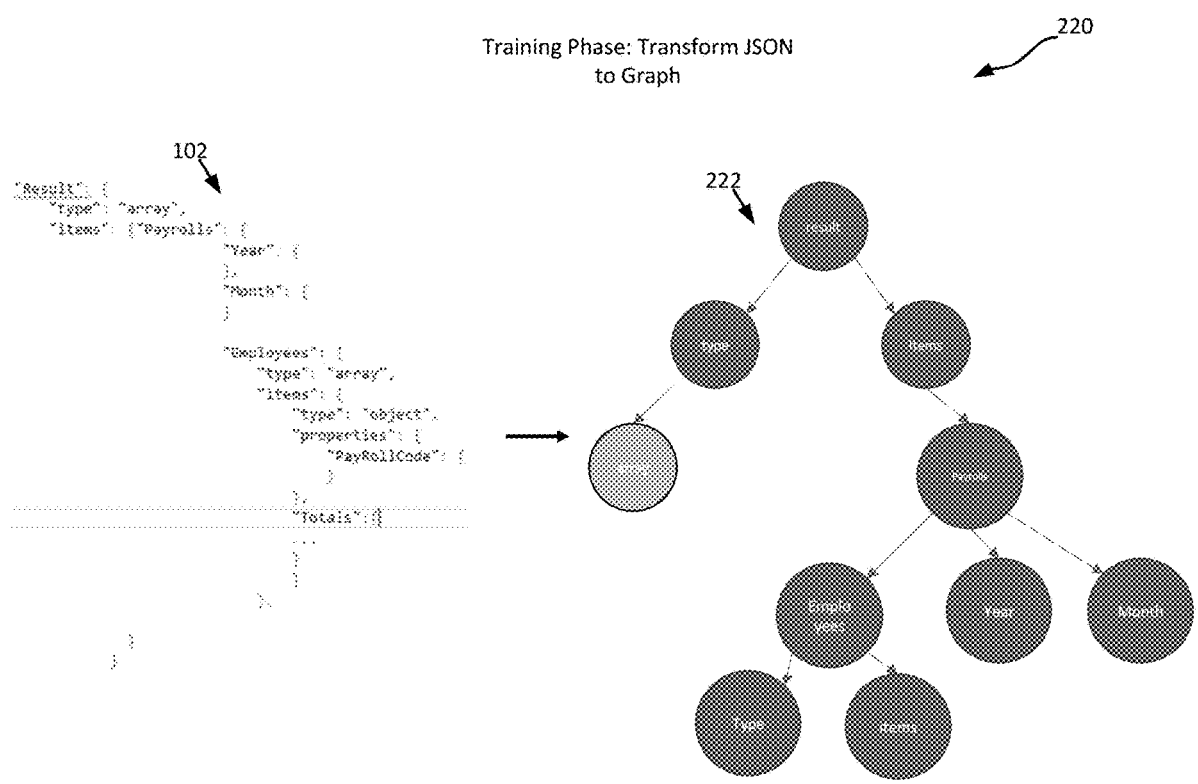
FIG. 2B shows a diagram of a JSON object transformed into a code graph, based on the principles disclosed herein.

Once a sufficient number of JSON objects and corresponding JAVA code pairs are captured, the training phase proceeds to step two of the training process shown in diagram 220 of FIG. 2B where a JSON object is transformed into a code graph. The code graph 222 is a model that represents code in a structured graph format. This is beneficial for easier analysis and manipulation of the code. The nodes of the graph may represent various code objects such as functions, classes, variables, etc. In the example of FIG. 2B, the nodes represent the overall object, object types, items in the object and the various strings, arrays and numerical values shown in JSON object 102. Generating code graph 222 may be performed by using a static analysis technique that extracts the graph structure directly from JSON object 102, a dynamic analysis that infers the graph structure, or a combination of the two.

Figure 2C:
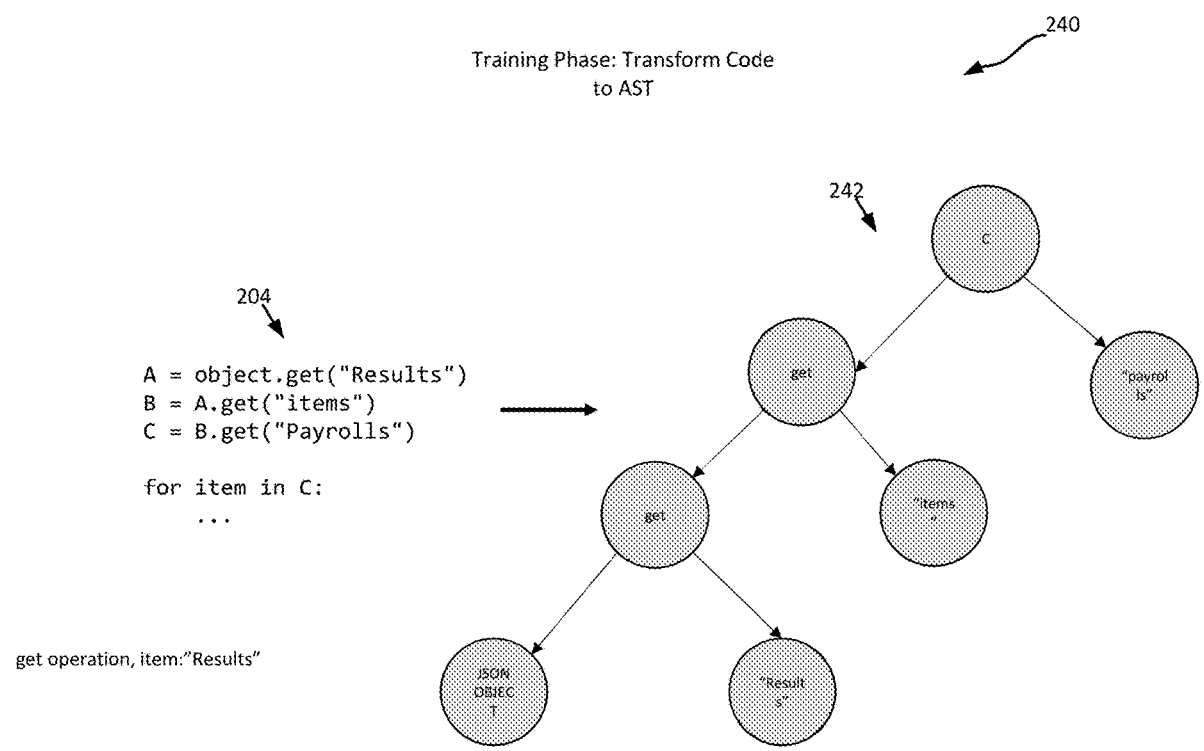
FIG. 2C shows a diagram of the code transformed into an abstract syntax tree, based on the principles disclosed herein.

Once the code graph is created, the training phase proceeds to step three of the training process shown in diagram 240 of FIG. 2C where the code transformed into an AST 242. In general, an AST is a hierarchical representation of the program code. Specifically, AST 242 is constructed by analyzing code 204 and capturing the structure of the code and relationships within the code. Each node in the AST represents a code structure or a code operation. For example, AST 242 includes a parent node for item "c" and child nodes that represent the "get" commands in the code and any logic in the code. It is noted that AST 242 in FIG. 2C is different than code graph 222 in FIG. 2B. Specifically, AST 242 represents the functionality of code 204, whereas code graph 222 represents the structure of the objects within the code. Together, code graph 222 and AST 242 fully describe code 204 in graphical form.

Figure 2D:
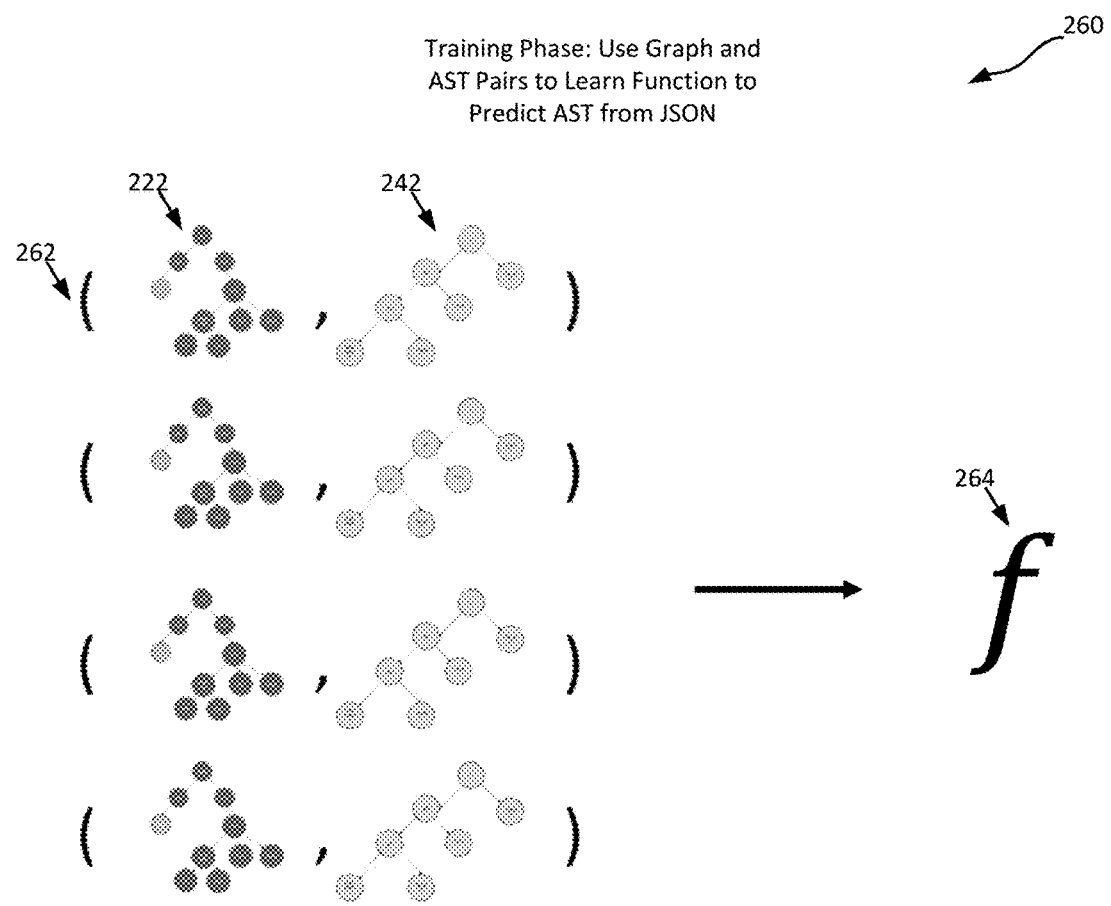
FIG. 2D shows a diagram of determining an abstract syntax tree prediction function based on pairs of code graphs and abstract syntax trees, based on the principles disclosed herein.

Once a desired number of code graphs and corresponding ASTs are determined for a number of JSON objects, the training phase proceeds to step four of the training process shown in diagram 260 of FIG. 2D for determining a function 264 based on pairs of code graphs and ASTs. Specifically, graph/tree pairs 262 may include a code graph 222 and AST 242 for corresponding JSON objects. The numbers of pairs may be in the hundreds or thousands depending on the available training data. In either case, a machine learning (ML) algorithm such as a recurrent neural network (RNN) may be trained by inputting a subset of the code graphs into the RNN and adjusting weights in the RNN to create a function 264 for predicting the ASTs based on the corresponding code graphs. The weights may be adjusted by comparing the predicted ASTs to the known ASTs for the input code graphs. Once training is complete, prediction accuracy of function 264 can be confirmed by inputting another subset of the known code graphs into the RNN in an attempt to predict the known corresponding ASTs. This ensures that the RNN is not overfitted and is accurately predicting ASTs from new code graphs.

Training the RNN may generally include defining the architecture of the RNN (e.g., number of layers, types of functions being performed at each node within the RNN, etc.), preparing the training data (e.g., extracting portions of the JSON object for input to different nodes of the RNN, etc.), initializing the RNN from scratch or based on a pretrained model (e.g., initializing node weights, etc.), performing forward propagation (e.g., propagating the JSON data through the various node layers to produce a predicted AST, etc.), back propagation (e.g., compute and propagate gradients through the model based on computed loss, etc.), updating the weights based on the gradients, repeating the above described steps, evaluating performance by comparing the predictions known results, and performing finetuning (e.g., adjusting hyperparameters, etc.)

RNNs are generally applicable to operating on JSON objects due to the hierarchical structured format of the JSON objects. Various RNNs may be implemented. One example of an RNN that may be used is a long short-term memory (LSTM) architecture that learns long-term dependencies in the sequential data. The LSTM may include interconnected memory cells including various states (e.g., cell states) and gates (e.g., input gates, forget gates and output gates). The overall operation of the LSTM may perform input processing, cell state updates and output computations. The gates control flow of data through the memory cells and also provide a mechanism to remember or forget certain data to provide long term memory while avoiding a vanishing gradient problem. In general, the LSTM may be beneficial in that it can track long term dependencies in the input data sequence.

Due to the nested tree structure of the object (e.g. JSON object), the RNN may be implemented as a GraphRNN which is designed to handle/predict structured data. The GraphRNN model works generally by decomposing the graph generation process to learn the graph structure (i.e. learn code graph structure and predict the corresponding AST graph structure). The GraphRNN may generate new graph nodes at each step and update the hidden state, while also generating edges for new nodes. GraphRNN training includes using the known code graphs, predicting the next node in the AST graphs and the connections in the AST graphs given the current state of the AST graphs. Once trained, GraphRNN can generate new AST graphs by predicting nodes and their connections one after another. In other words, the GraphRNN uses the known code graphs of the JSON objects to determine how to predict the AST graph nodes and connections. This knowledge is then used to determine new AST graphs for new JSON objects.

In either case, once the learning phase is complete, a function 264 is learned. Function 264 can be used in the prediction phase for newly received JSON objects that may have similar, but different formats than the known JSON objects used during training. The prediction phase generally includes two steps. The first step of the prediction phase is to transform a new JSON object (JSON object with a new format) to a code graph and then apply the function 264 learned during the training phases to convert the code graph into a corresponding AST. The second step of the prediction phase is to compile the predicted AST to create a coded function that transforms the new JSON object to the standardized data format (e.g., the table). These two steps are now described with respect to FIGS. 3A and 3B.

Figure 3A:
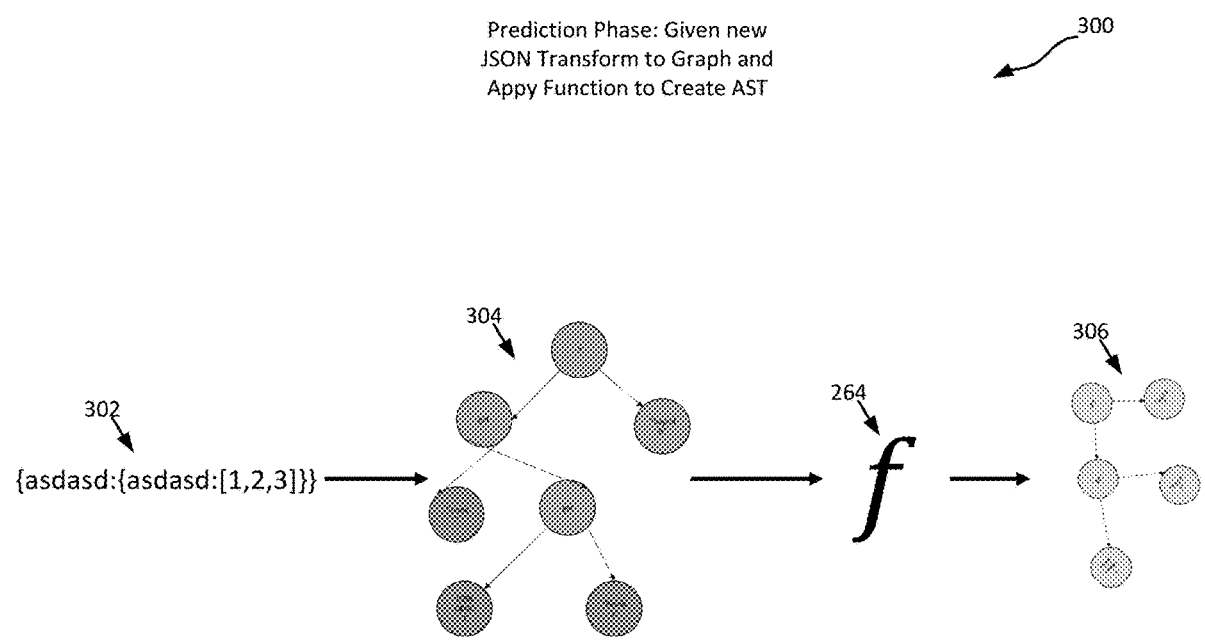
FIG. 3A shows a diagram of using the prediction function to transform the code graph to a corresponding abstract syntax tree, based on the principles disclosed herein.

Predicting ASTs by the RNN generally includes preprocessing the input JSON object into a code graph to be input to the RNN, performing coding if beneficial, and sequentially feeding the preprocessed data into the input layer of the RNN, and generating a predicted output (i.e., AST structure and values). FIG. 3A shows a diagram 300 of using the function to transform the code graph to a corresponding abstract syntax tree. As mentioned above, JSON objects can be transformed into code graphs. In this case, a new JSON object 302 is converted into a new code graph 304 using static techniques, dynamic techniques or a combination of the two. The nodes of the graph represent various code objects such as functions, classes, variables, etc. The generated code graph 304 is input to learned function 264 from the training phase. Learned function 264 converts code graph 304 into a new corresponding AST 306.

Figure 3B:
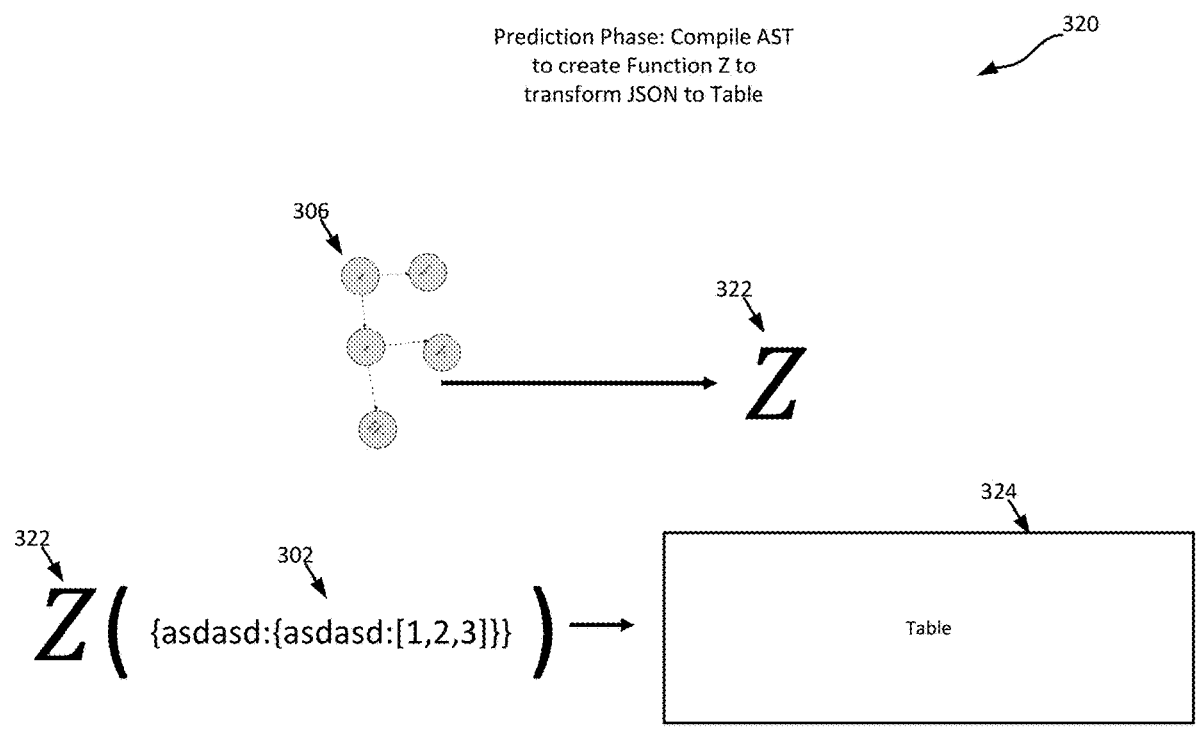
FIG. 3B shows a diagram of compiling the abstract syntax tree to transform the JSON object into the standardized data structure, based on the principles disclosed herein.

Once the new corresponding AST 306 is determined, the process can proceed to step two of the prediction phase 320 shown in FIG. 3B where the AST is compiled to transform the corresponding JSON object into the standardized data structure. For example, AST 306 is compiled to create a function 322 which converts JSON object 302 into the desired standard data structure (e.g., table) 324.

It is noted that the steps of the training process as illustrated in FIGS. 3A and 3B may be repeated for each new JSON object received. As long as the ML algorithm is properly trained, function 264 predicts an accurate AST which can then be compiled into function 322 for obtaining code for accurately converting the JSON object 302 into the desired table format 324.

It is noted that the function 264 could be updated continuously or periodically as new training data is received. For example, incorrect predictions could be corrected manually by the programmers and then used as new training data in a subsequent learning phase. After each subsequent learning phase, function 264 is updated to more accurately predict the AST corresponding to the JSON object.

As described above, the process performed by the system and method disclosed herein includes both a training phase and a prediction phase. Each of these phases are described in detail with respect to FIGS. 4 and 5 below.

Figure 4:
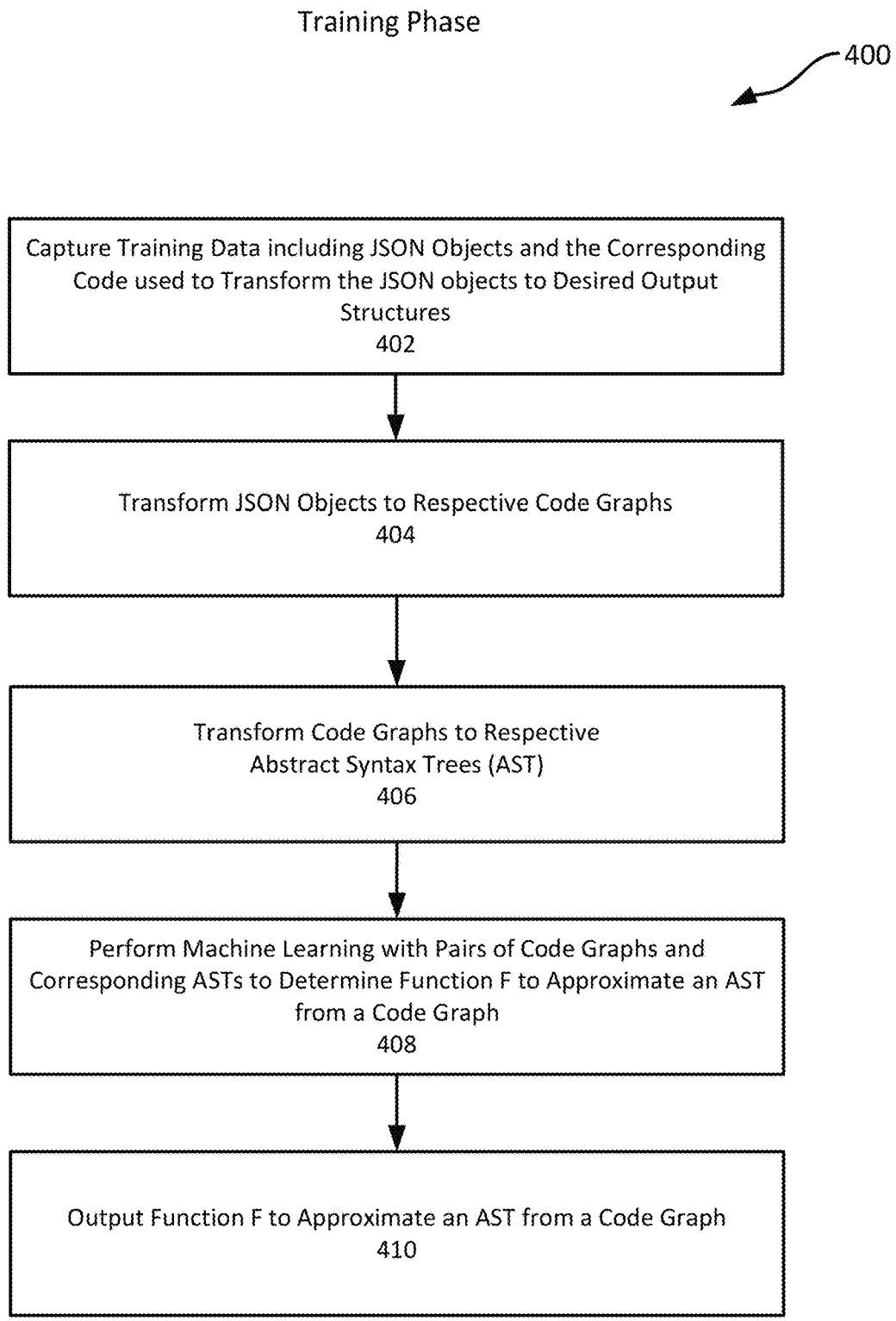
FIG. 4 shows a flowchart for the training phase of the LEST system, based on the principles disclosed herein.

FIG. 4 shows a flowchart 400 for the training phase of the disclosed LEST system. In step 402, the training data is captured or received. This training data generally includes known JSON objects and corresponding code that accurately converts the JSON objects to the desired output structure (e.g., desired table structure). Generally, hundreds or thousands of pairs may be used to accurately train the algorithm. In step 404, the training phase transforms the JSON objects to respective code graphs, and in step 406, the training phase transforms the code graphs into respective ASTs. Once the JSON objects are represented by code graphs and ASTs, the code graphs and ASTs may be paired up and used as training data for the ML algorithm. For example, in step 408 the training phase performs machine learning by inputting the code graphs into the algorithm (e.g., RNN) for predicting the corresponding ASTs and adjusting weights of the algorithm based on accuracy of the predictions. Once the training is complete, the function 264 for accurately predicting ASTs based on code graphs is generated. Then, in step 410, the function 264 is output to the system for performing the prediction phase.

Figure 5:
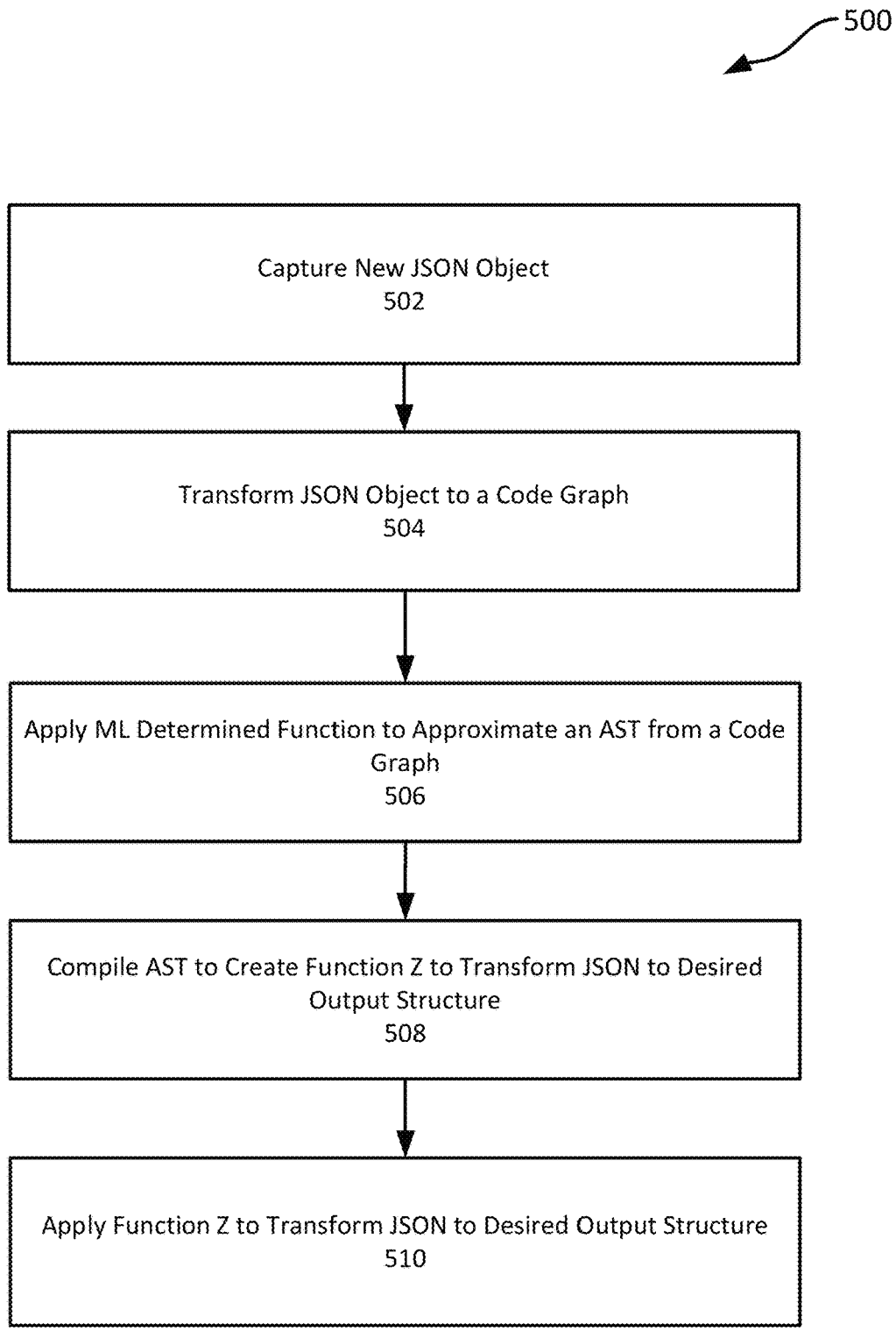
FIG. 5 shows a flowchart for the prediction phase of the LEST system, based on the principles disclosed herein.

FIG. 5 shows a flowchart 500 for the prediction phase of the LEST system. In step 502, a new JSON object is captured. This JSON object may have a different structure than the JSON objects used during training. In step 504, the prediction phase transforms the new JSON object into a code graph. The prediction phase then applies the function 264 to the code graph in step 506 in order to predict the corresponding AST associated with the code graph. In step 508, the prediction phase compiles the predicted AST to create a function 322 to transform the new JSON into the desired format (e.g., the table). In step 510, the prediction phase applies the created function 322 to perform the desired transformation. Steps 502-510 may be repeated as necessary for newly captured JSON objects. As mentioned above, the training phase may also be repeated as desired when new training data is received or generated. This ensures that the prediction algorithm is accurate regardless of the varying formats of the JSON objects being received.

Figure 6:
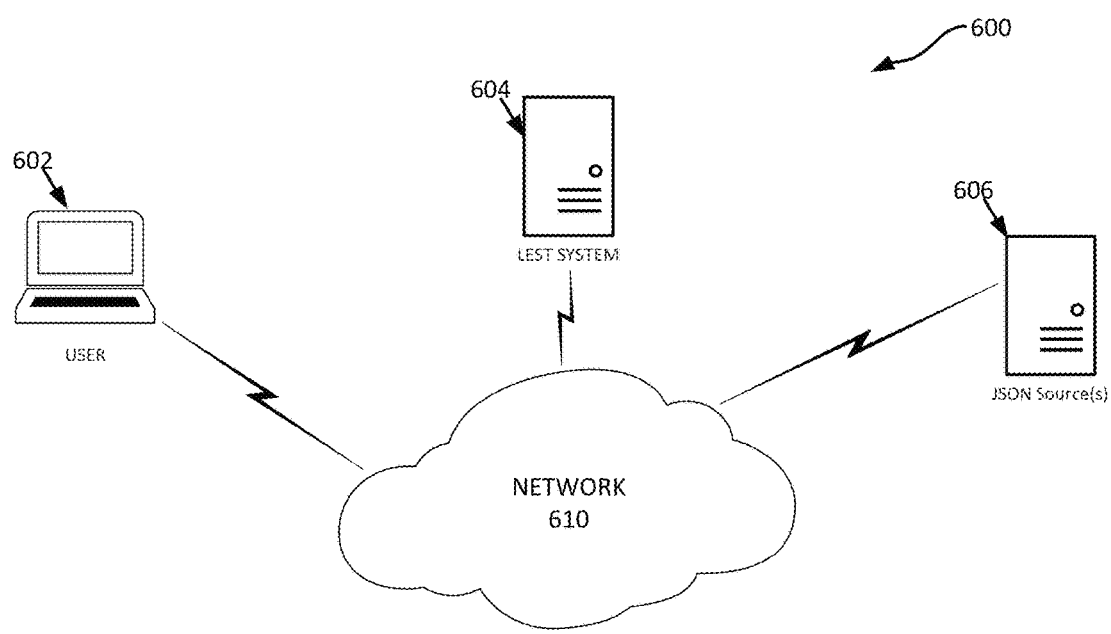
FIG. 6 shows a network diagram of the LEST system, based on the principles disclosed herein.

FIG. 6 shows an example of a system 600 configured for providing the LEST system shown in FIGS. 2A-2D, 3A, 3B, 4 and 5. It should be understood that the components of the system 600 shown in FIG. 6 and described herein are merely examples and systems with additional, alternative, or fewer number of components should be considered within the scope of this disclosure.

As shown, the LEST system 600 comprises at least one end user device 602 and servers 604 and 606 interconnected through a network 610. In the illustrated example, server 604 supports operation of the LEST system and server 606 supports operation of the JSON data source(s). In the illustrated example, user device 602 is a PC but could be any device (e.g., smartphone, tablet, etc.) providing access to the servers via network 610. User device 602 has a user interface UI, which may be used to communicate with the servers using the network 610 via a browser or via software applications. For example, user device 602 may allow the user to access the LEST system and JSON sources running on servers 604 and 606, thereby initiating conversion of JSON objects to standardized data objects (e.g., tables). The network 610 may be the Internet and or other public or private networks or combinations thereof. The network 610 therefore should be understood to include any type of circuit switching network, packet switching network, or a combination thereof. Non-limiting examples of the network 610 may include a local area network (LAN), metropolitan area network (MAN), wide area network (WAN), and the like.

In an example, end user device 602 may communicate with servers 604 and 606 via a software application to control LEST system disclosed herein. The software application may initiate server 604 to perform LEST on the JSON objects of the JSON source(s) according to the systems/methods shown in FIGS. 1-5.

Servers 604, 606 and user device 602 are each depicted as single devices for ease of illustration, but those of ordinary skill in the art will appreciate that servers 604 and 606 and user device 602 may be embodied in different forms for different implementations. For example, any or each of the servers may include a plurality of servers including a plurality of databases, etc. Alternatively, the operations performed by any of the servers may be performed on fewer (e.g., one or two) servers. In another example, a plurality of user devices (not shown) may communicate with the servers. Furthermore, a single user may have multiple user devices (not shown), and/or there may be multiple users (not shown) each having their own respective user devices (not shown). Regardless, the hardware configuration shown in FIG. 6 may be a system that supports the functionality of the LEST system shown in FIGS. 1-5.

Figure 7:
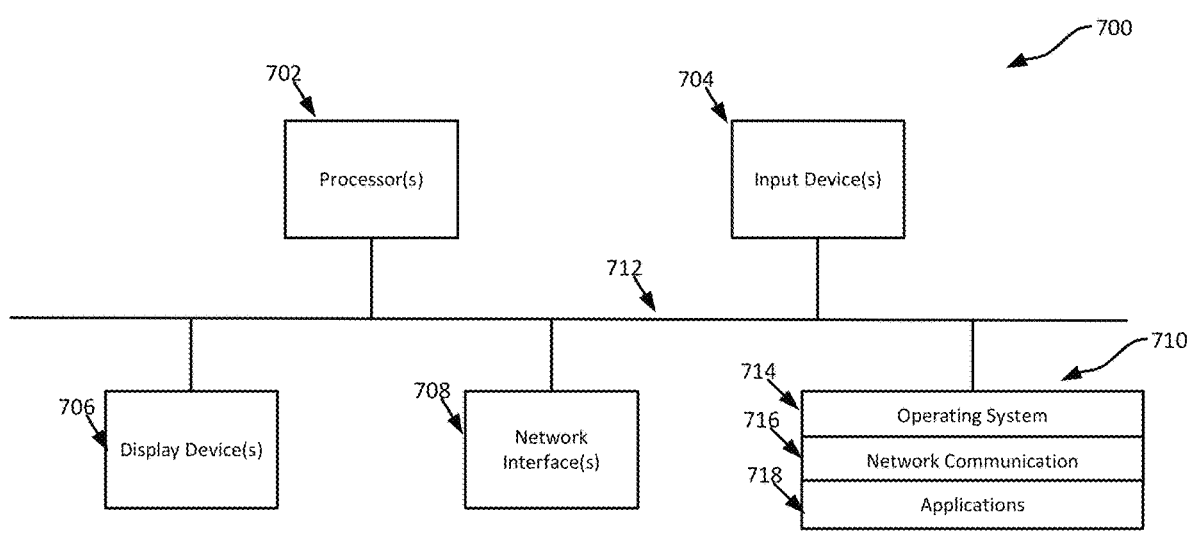
FIG. 7 shows a block diagram of an example computing system that implements various features and processes of the LEST system, based on the principles disclosed herein.

FIG. 7 shows a block diagram of an example computing device 700 that is configured for facilitating the LEST system based on the principles disclosed herein. For example, computing device 700 may function as the servers 604, 606 and/or user device 602, or a portion or combination thereof in some embodiments. The computing device 700 performs one or more steps of the methods shown in FIGS. 1-5. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 710. Each of these components is coupled by a bus 712.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 712 includes any internal or external bus technology, including but not limited to ISA, EISA, PCI, PCI Express, USB, Serial ATA or FireWire. Computer-readable medium 710 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 establish and maintain network connections (e.g., software for implementing communication protocols, such as TCP/IP, HTTP, Ethernet, telephony, etc.). Application(s) 718 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user devices and servers. A user device and server may generally be remote from each other and may typically interact through a network. The relationship of user device and server may arise by virtue of computer programs running on the respective computers and having a relationship with each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, the method comprising:
    a) capturing training data including training nested tree objects and corresponding code to transform the training nested tree objects into a desired data structure;
    b) transforming the training nested tree objects into training code graphs;
    c) transforming code graphs into training abstract syntax trees (ASTs); and
    d) performing machine learning with pairs of the training code graphs and corresponding training ASTs to determine a first function to predict a new AST from a new code graph.

2. The method of claim 1, further comprising:
    e) capturing a new nested tree object;
    f) transforming the new nested tree object to a new code graph;
    g) applying the first function to predict the new AST from the new code graph;
    h) compiling the new AST to create a second function to transform the new nested tree object to the desired data structure; and
    i) applying the second function to transform the new nested tree object to the desired data structure.

3. The method of claim 2, further comprising:
applying the second function to transform the new nested tree object to the desired data structure by mapping structures within the new nested tree object to positions in a table.

4. The method of claim 1, further comprising:
capturing the training nested tree objects and corresponding code to transform the new nested tree objects into a standardized data structure.

5. The method of claim 1, further comprising:
capturing the training nested tree objects and the corresponding code from a database where the corresponding code was manually written in response to the training nested tree objects.

6. The method of claim 1, further comprising:
transforming the training nested tree objects into the training code graphs where each node in the training code graphs correspond to the structures in the nested tree objects.

7. The method of claim 1, further comprising:
transforming the training code graphs into the training ASTs where each node in the training ASTs correspond to commands for retrieving the structures in the training nested tree objects.

8. The method of claim 1, further comprising:
performing the machine learning using a recurrent neural network (RNN) where the training code graphs are input to the RNN which produces predicted ASTs that are compared to the training ASTs corresponding to the training code graphs.

9. The method of claim 1, further comprising:
repeating steps a to d to determine a third function to predict a new AST from the new code graph for a new desired data structure.

10. The method of claim 9, further comprising:
repeating steps e to i to compile the new AST to create and apply the third function to transform the new nested tree object to the new desired data structure.

11. A system comprising:
a non-transitory storage medium storing computer program instructions; and
one or more processors configured to execute the computer program instructions to cause operations comprising:
 a) capturing training data including training nested tree objects and corresponding code to transform the training nested tree objects into a desired data structure;
 b) transforming the training nested tree objects into training code graphs;
 c) transforming code graphs into training abstract syntax trees (ASTs); and
 d) performing machine learning with pairs of the training code graphs and corresponding training ASTs to determine a first function to predict a new AST from a new code graph.

12. The system of claim 11, wherein the operations further comprise:
 e) capturing a new nested tree object;
 f) transforming the new nested tree object to the new code graph;
 g) applying the first function to predict the new AST from the new code graph;
 h) compiling the new AST to create a second function to transform the new nested tree object to the desired data structure; and
 i) applying the second function to transform the new nested tree object to the desired data structure.

13. The system of claim 12, wherein the operations further comprise:
applying the second function to transform the new nested tree object to the desired data structure by mapping structures within the new nested tree object to positions in a table.

14. The system of claim 11, wherein the operations further comprise:
capturing the training nested tree objects and corresponding code to transform the new nested tree objects into a standardized data structure.

15. The system of claim 11, wherein the operations further comprise:
capturing the training nested tree objects and the corresponding code from a database where the corresponding code was manually written in response to the training nested tree objects.

16. The system of claim 11, wherein the operations further comprise:
transforming the training nested tree objects into the training code graphs where each node in the training code graphs correspond to the structures in the nested tree objects.

17. The system of claim 11, wherein the operations further comprise:
transforming the training code graphs into the training ASTs where each node in the training ASTs correspond to commands for retrieving the structures in the training nested tree objects.

18. The system of claim 11, wherein the operations further comprise:
performing the machine learning using a recurrent neural network (RNN) where the training code graphs are input to the RNN which produces predicted ASTs that are compared to the training ASTs corresponding to the training code graphs.

19. The system of claim 11, wherein the operations further comprise:
repeating steps a to d to determine a third function to predict the new AST from the new code graph for a new desired data structure.

20. The system of claim 19, wherein the operations further comprise:
repeating steps e to i to compile the new AST to create and apply the third function to transform the new nested tree object to the new desired data structure.

* * * * *